(12) United States Patent
Martin et al.

(10) Patent No.: US 6,229,284 B1
(45) Date of Patent: May 8, 2001

(54) METHOD FOR CONTROLLING AN ACCUMULATOR CHARGE AND DEVICE FOR IMPLEMENTING SUCH METHOD

(75) Inventors: Jean-Claude Martin, Neuchâtel; Jean-Charles Guanter, Diesse, both of (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/589,199

(22) Filed: Jun. 8, 2000

(30) Foreign Application Priority Data

Jun. 11, 1999 (EP) .................................................. 99111447

(51) Int. Cl.⁷ .......................... H01M 10/44; H01M 10/46
(52) U.S. Cl. ............................................................... 320/130
(58) Field of Search ..................................... 320/127, 128, 320/130, 132, 137, 139, 149, DIG. 21, 166

(56) References Cited

U.S. PATENT DOCUMENTS

| | | | |
|---|---|---|---|
| 3,898,548 | * | 8/1975 | Perelle et al. . |
| 4,307,330 | | 12/1981 | Belot . |
| 4,678,999 | * | 7/1987 | Schneider . |
| 5,372,898 | * | 12/1994 | Atwater et al. . |
| 5,537,023 | * | 7/1996 | Hanselmann et al. . |

FOREIGN PATENT DOCUMENTS

| | | |
|---|---|---|
| 41 12 987 | 10/1992 | (DE) . |
| 0 288 013 | 10/1998 | (EP) . |
| 0 874 294 | 10/1998 | (EP) . |

* cited by examiner

*Primary Examiner*—Edward H. Tso
(74) *Attorney, Agent, or Firm*—Griffin & Szipl, P.C.

(57) ABSTRACT

The present invention concerns a method for controlling the charge of an accumulator (4), as a function of the time during which said accumulator (4) has been on a charger (2), said accumulator (4) being intended to power an horological function and one or more auxiliary functions (14), this method being characterized in that it includes the steps of: incrementing a step counting signal during the charge time during which the accumulator (4) is on the charger (2); causing the accumulator (4) charge to stop when the counting signal has reached a previously defined maximum value corresponding to the nominal charge of said accumulator (4); and decrementing the step counting signal during the discharge time during which the accumulator (4) is not on the charger (2), the counting signal being decremented by a first step when only the horological function is being used, and by a second step which differs from the first and which depends on the auxiliary function or functions (14) used.

13 Claims, 6 Drawing Sheets

METHOD FOR CONTROLLING AN ACCUMULATOR CHARGE AND DEVICE FOR IMPLEMENTING SUCH METHOD

The present invention concerns method for controlling an accumulator charge as well as a device for implementing this method. It concerns in particular accumulators intended for wireless applications such as watches, portable telephones, video cameras etc.

For a conventional electronic watch to operate properly, a simple low voltage battery is sufficient. The movements which are fitted to this type of watch consume very low currents of the order of several microamperes at voltages usually not exceeding 1.5volts. Low voltage batteries generally give these watches autonomy for approximately two years.

However it is currently sought to integrate in the watch additional auxiliary devices such as, for example, a transceiver device associated with an antenna allowing the watch to be used like a telephone. Such a device requires much higher currents and voltages than those required for the simple horological function. By way of example, when the radio-frequency link is in service, the electric consumption is established at values higher than 50mA for voltages which exceed 2.5volts. Confronted with such high power requirements, the batteries cannot assure a suitable power supply since they would run down very quickly, which would oblige the watch wearer to replace them frequently. In order to overcome this drawback, it has thus been decided to use rechargeable accumulators to power the auxiliary functions. For reasons of cost and compactness, the battery has been omitted and the horological function, whose power consumption is minimal, is also powered by the accumulators.

In order to charge an accumulator, various methods are known. Among these methods, the most commonly used is that known under the name of the quick charging method which consists in injecting into the accumulator, within limits fixed by the manufacturer, a constant current which is the higher the quicker one wishes the charge to be. The difficulty of such a method consists in determining when to stop charging, knowing that several minutes of overcharge reduce, by overheating, the lifetime of the accumulator, and that several tens of minutes in excess can put it out of use or destroy it.

Numerous methods exist for determining the end of the quick charge of an accumulator when it has reached its nominal charge. These methods are characterized by their reaction time after the end of charging. This reaction time has to be as short as possible in order to protect the accumulator against any overheating. These methods are also characterized by their reliability, able to be repeated and their cost.

The most conventional method uses the characteristic accumulator charge voltage curve. When the accumulator is full, and even slightly overcharged, the voltage decreases slightly after having increased continually during charging. This voltage drop is detected by an electronic control circuit which then decides to stop the charging.

This method has two drawbacks. First of all, when the voltage decreases, the accumulator is already slightly overcharged and its temperature has already started to increase. It is thus already a little late, since it is overheating which is the primary cause of accumulator ageing. This is all the more true the quicker the charging. The higher the charge current, the greater the overcharge and overheating. Secondly, certain accumulators have a less pronounced voltage drop which is thus much more difficult to detect.

A more recent method consists in measuring, not only the charge voltage, but also the temperature of the accumulator and deciding to stop the charge when the temperature increase rate exceeds a certain threshold. The temperature remains constant during almost the entire charging and begins to increase more and more strongly towards the end thereof. With this temperature measuring method, the charge is stopped when the temperature increases at a greater speed than a certain rate fixed in advance.

One drawback of this method is that it requires a temperature sensor on each accumulator, as well as one or two additional contacts at the accumulator-charger connection. This is sometimes a very high cost. A second drawback of this method is that the temperature propagates slowly from the core of the battery to its periphery and then to the sensor. In other words, when the charge is stopped, the accumulator has already had time to be overheated.

Contrary to the quick charge methods described above, so-called slow charge methods can also be used, which consist in injecting into the accumulator a current whose intensity is low compared to its capacity. For example, a constant current of 10 mA can be permanently applied to an accumulator of 100mAh without any risk of damaging it. For higher charge currents, of the order of 20mA to 30mA, it is possible to define the end of the accumulator charge as a function of the time during which the latter has been on the charger.

This latter solution has however a significant drawback. If one takes account solely of the time which has elapsed since the moment when the accumulator was put onto the charger, the fact of removing it then immediately putting the accumulator back onto the charger completely resets the charge time limit. The same problem is posed in the event of a micro-interruption in the electric power network or when the charger undergoes a shock which momentarily interrupts the electric connection between the latter and the accumulator.

The object of the present invention is to overcome the above problems and drawbacks by providing an accumulator charge control method which allows the accumulator charge to be stopped prior to the occurrence of overheating, and thus prior to overcharging, without requiring a complex and costly device.

The present invention therefore concerns a method for controlling the charge of an accumulator as a function of the time during which said accumulator has been on a charger said accumulator being intended to power an horological function and one or more auxiliary functions, this method being characterized in that it includes the steps of:

incrementing a step counting signal during the charge time during which the accumulator is on the charger;

causing the accumulator charge to stop when the counting signal has reached a previously defined maximum value corresponding to the nominal charge of said accumulator; and decrementing the step counting signal during the discharge time during which the accumulator is not on the charger, the counting signal being decremented with a first step when only the horological function is used, and with a second step which differs from the first and which depends on the auxiliary function or functions used so that, if the counting signal reaches zero, the next charge will be made until said counting signal has again reached its maximum value, whereas if the accumulator is replaced on the charger before the counting signal has reached zero, the next charge will be made for a shorter period of time.

As a result of these features, the present invention provides a method for controlling the charge of an accumulator which allows the accumulator charge to be interrupted sufficiently early so that, whatever the circumstances, said accumulator does not have time to overheat, which significantly increases its lifetime. Further, contrary to the prior art, the present invention does not require a complex and expensive electronic device, for example to monitor the evolution of the charge voltage or to measure the accumulator temperature, which allows substantial savings to be made.

According to one advantage of the invention, not only the accumulator charge time is counted, but also the time during which the latter is not on the charger, only authorising a completely new charge of the accumulator if the counter reaches zero. Thus, if for example, a micro-interruption occurs in the power supply network, the charge limit time is not completely reset, which allows any damaging overcharge of the accumulator to be avoided.

According to another feature of the invention, whatever interruption occurs to the accumulator charge before the counting signal has reached its maximum value corresponding to the nominal accumulator charge, the step with which said counting signal is decremented is that which would have been observed for the same auxiliary function after having reached said maximum value.

Conversely, if the accumulator is replaced on the charger before the counting signal has reached zero, only a partial charge is authorized, and the step with which said counting signal is incremented is the same as that which would have been used for a complete charge.

The present invention also concerns a device for controlling an accumulator charge as a function of the time during which the accumulator has been on a charger, said accumulator being intended to power a horological function and one or more auxiliary functions, this device being characterized in that it includes an electronic control circuit which increments a step counter during the charge time during which the accumulator is on the charger, causes the accumulator charge to be stopped when the counter has reached a maximum value corresponding to the nominal charge of said accumulator and decrements the step counter during the discharge time during which the accumulator is not on the charger, the counter being decremented with a first step when only the horological function is used, and with a second step which differs from the first and which depends on the auxiliary function or functions used so that, if the counter reaches zero, the next charge authorized by the electronic control circuit will be made until the counter has again reached its maximum value, whereas if the accumulator is replaced on the charger before the counter has reached zero, the electronic control circuit only authorizes partial charging of the accumulator.

Other features and advantages of the present invention will appear more clearly upon reading the following detailed description of an example of implementation of the method according to the invention, this example, being given purely by way of non-limiting illustration, in conjunction with the annexed drawings in which.

Figure 5:
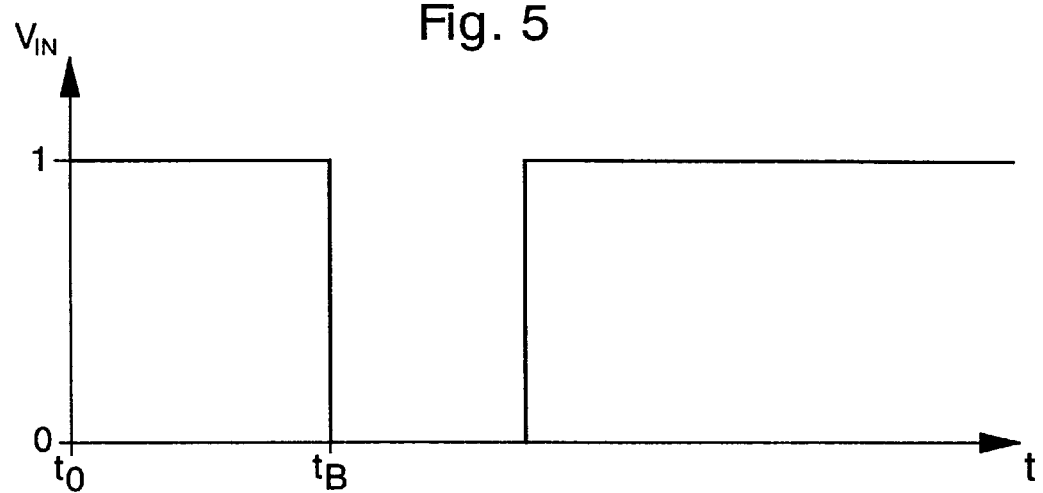
Figure 5:
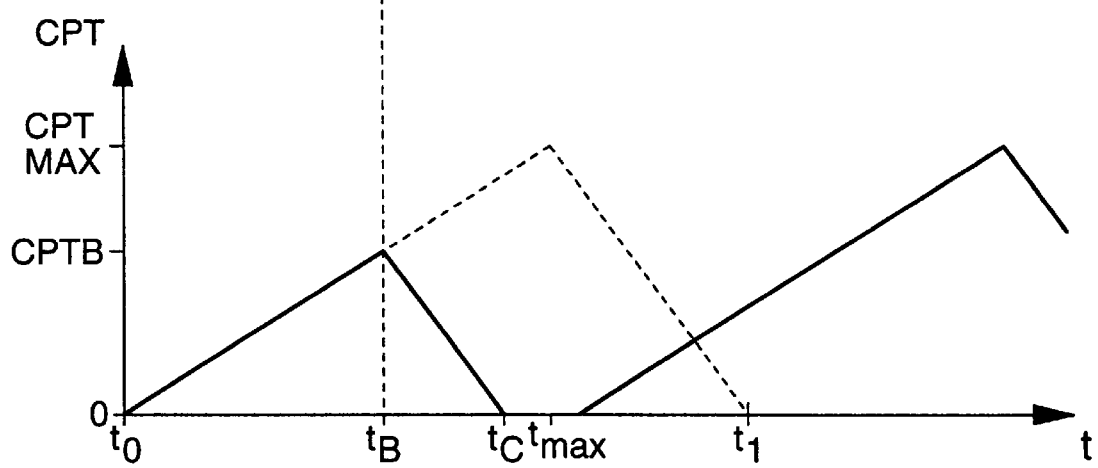
Figure 5:
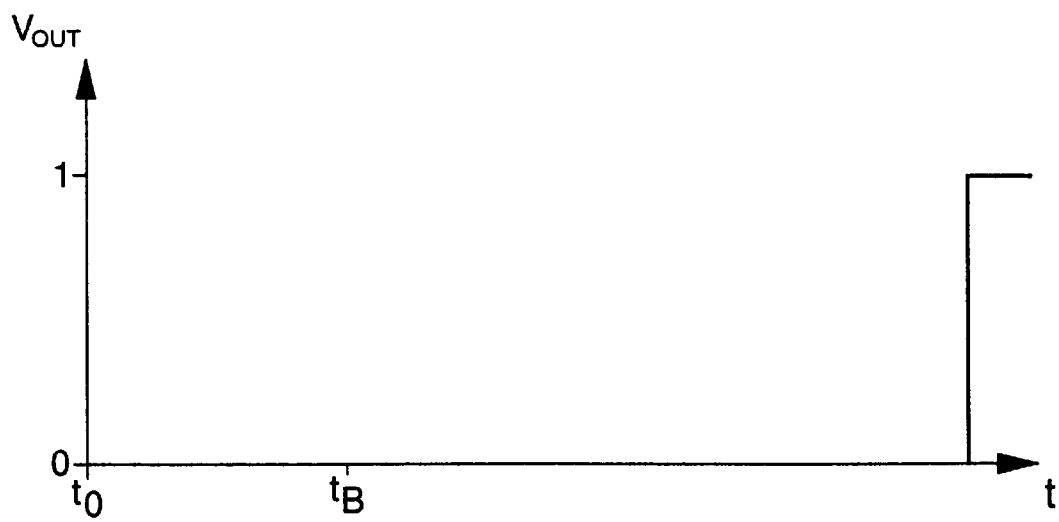
Figure 6:
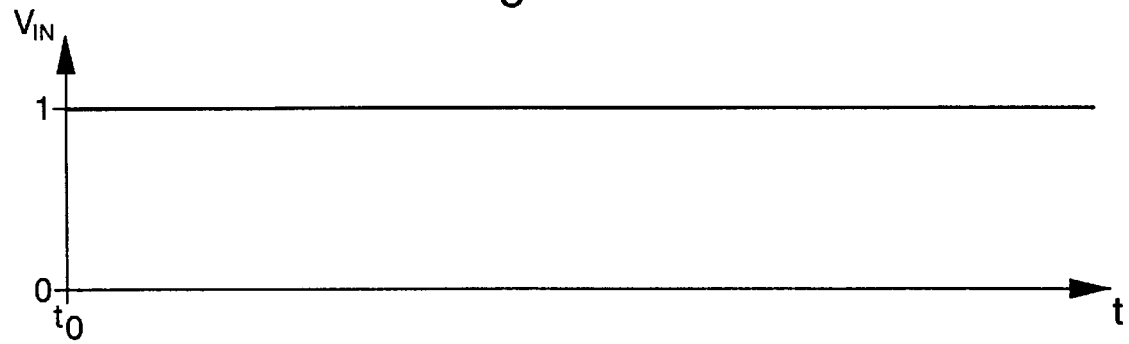
Figure 6:
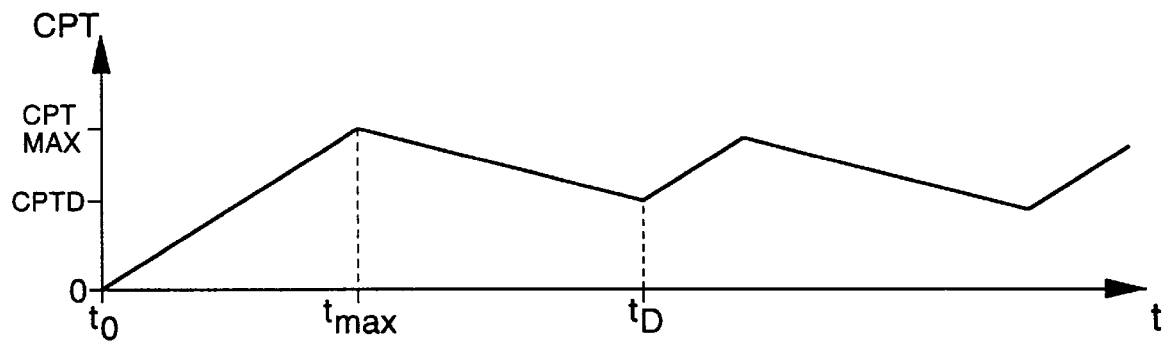
Figure 6:
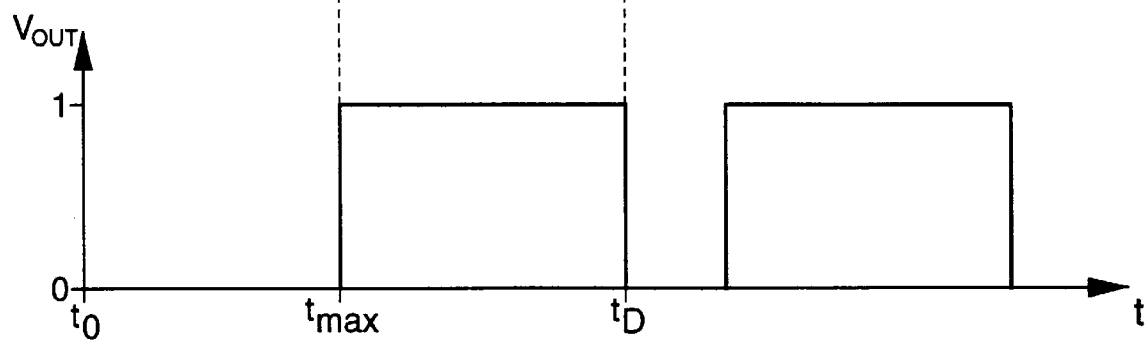

FIG. 5 is a graphic diagram of an accumulator charge/discharge cycle when the latter is removed from the charger before the counter has reached its maximum value CPTMAX corresponding to the nominal charge of said accumulator; and FIG. 6 illustrates the case in which the accumulator is left on the charger after the counter has reached its maximum value CPTMAX corresponding to the maximum charge of the accumulator, and where a partial charge of the accumulator is authorized at regular intervals in order to maintain the charge thereof.

The present invention proceeds from the general inventive idea which consists not only in counting the accumulator charge time, but also counting down the time during which the accumulator is not on the charger, so that if the accumulator is removed then immediately replaced on the charger, this does not completely reset the charge limit time, which advantageously allows any overcharge of the accumulator to be avoided. Likewise, the value CPTMAX of the counter beyond which the accumulator charge is interrupted is adjusted as a function of the charge current intensity, so that the nominal accumulator charge is reached without the accumulator having time to overheat.

The present invention will be described with reference to a timepiece provided with high power consumer auxiliary devices such as, for example, a transceiver device associated with an antenna allowing said timepiece to be used like a telephone. However it goes without saying that the present invention also applies in a similar manner to all types of portable devices including a time base and accumulators such as a video camera, a portable telephone or the like.

Figure 1:
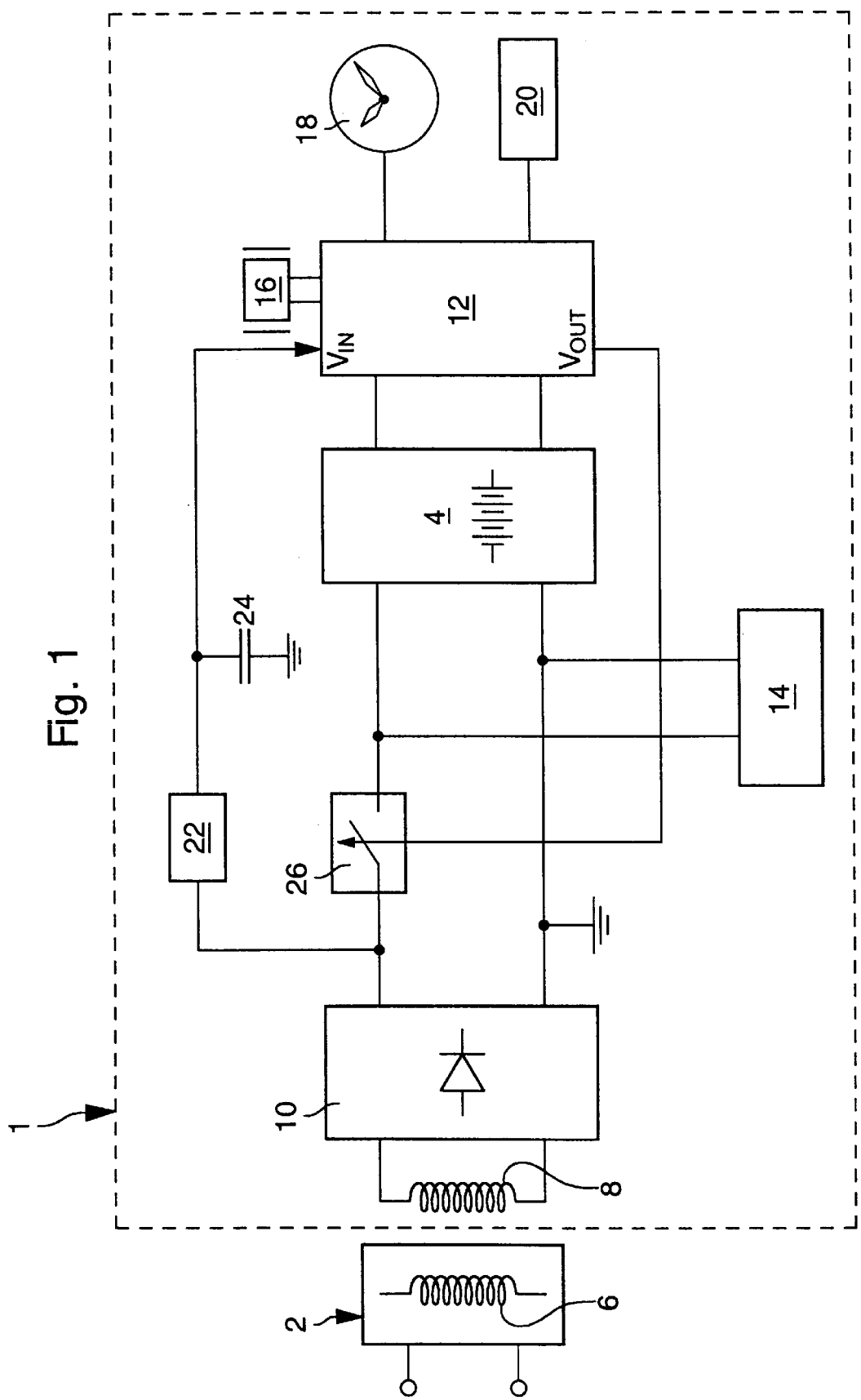
FIG. 1 is a schematic diagram of an electronic control circuit for implementing the method according to the invention.

FIG. 1 shows the accumulator charge control device according to the invention. This device is designated as a whole by the general numerical reference 1. It concerns a portable system electrically connected to a charger 2 for charging an accumulator 4. In the example shown in FIG. 1, accumulator 4 is charged by induction. For this purpose, a first coil 6 constitutes the primary of charger 2, whereas a second coil 8 placed in the charge circuit of accumulator 4 constitutes the secondary of said charger 2. As accumulator 4 is intended to be fitted to a watch, one prefers to recharge it by induction rather than using ohmic contacts to connect it to charger 2, in order to avoid problems of corrosion of the metal contacts and altering the sealing of the watch. It will be understood nonetheless that the method according to the present invention can be implemented whatever the type of charger used to recharge accumulator 4. Accumulator 4 is supplied with a direct current through a rectifier circuit 10 which rectifies the current from the magnetic coupling between the two coils 6 and 8. Accumulator 4 in turn supplies power to an electronic control circuit 12 as well as one or more auxiliary devices 14 such as, for example, a transceiver device electrically connected to an antenna in order to be able to use the watch like a telephone.

The operating mode of electronic control circuit 12 will now be examined in detail. According to the invention, the latter is formed by a clockwork processor including a time base and an incremental counter able to count the charge/discharge time of accumulator 4. The time base is provided to the clockwork processor by a quartz oscillator 16. Control circuit 12 can control an analogue time display 18 as well as, for example, a liquid crystal display device 20.

Figure 2:
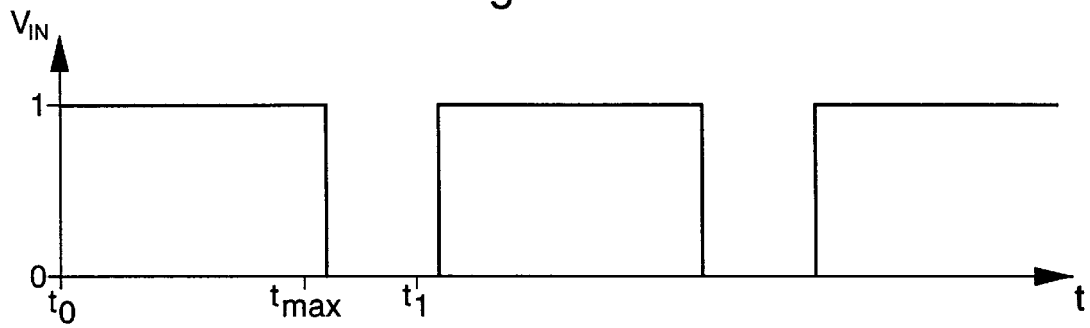
FIG. 2 is a graphic diagram of a succession of accumulator charge/discharge cycles according to the method of the invention.
Figure 2:
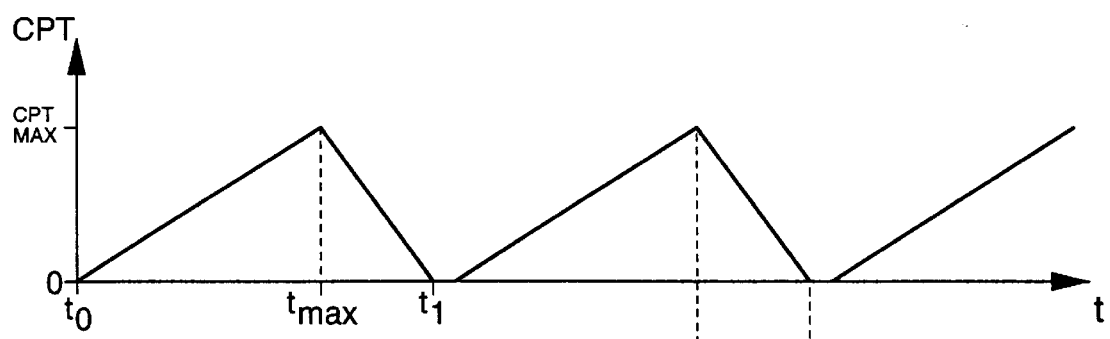
Figure 2:
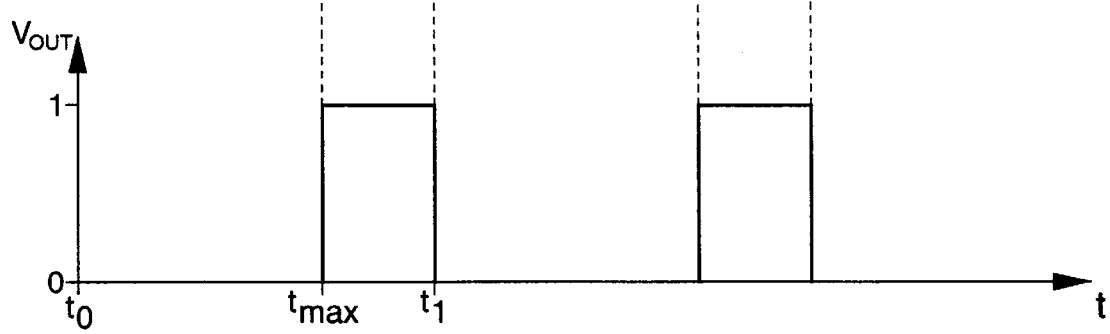

As FIG. 1 shows, a charge control signal $V_{IN}$ is picked up at the output of rectifier circuit 10 and is applied through a resistor 22 and a capacitor 24 to the input of control circuit 12. This charge control signal $V_{IN}$ is set at 1 (FIG. 2) at instant $t_0$ when accumulator 4 is placed on charger 2 and begins to be charged with a direct charge current. At the moment when control signal $V_{IN}$ passes to 1, control circuit 12 begins to count the charge time. Counting signal CPT then progressively increases from zero to a maximum value CPTMAX when the charge time reaches a limit value $t_{max}$ corresponding to the nominal charge of accumulator 4. The step with which the counting signal CPT is incremented is modulated as a function of the intensity of the charge current which is injected into accumulator 4, so that the latter reaches its nominal charge without having had time to overheat. It is clear that the higher the charge current, the quicker counting signal CPT increases.

At the moment when the counting signal reaches its maximum value CPTMAX, control circuit 12 causes the charging of accumulator 4 to stop, by setting a charge interruption signal $V_{OUT}$ to 1. This interruption signal $V_{OUT}$ is applied to interruption means such as an switch 26 which it instructs to open, which has the effect of opening the charge circuit of accumulator 4.

In the simplest case when accumulator 4 is removed from charger 2 a short time after instant $t_{max}$ when accumulator 4 has reached its nominal charge, charge control signal $V_{IN}$ is set to zero, charge interruption signal $V_{OUT}$ remains at 1, and control circuit 12 begins to count down the discharge time during which accumulator 4 is no longer on charger 2. Counting signal CPT then progressively decreases from its maximum value CPTMAX to zero when the discharge time has reached a value $t_1$, beyond which control circuit 12 again authorizes a complete charge of accumulator 4. This causes the passage of interruption signal $V_{OUT}$ to zero, so that the charge circuit of accumulator 4 closes again and a new charge thereof can be made. Then, when accumulator 4 is replaced on charger 2, charge control signal $V_{IN}$ is set to 1 and control circuit 12 begins to increment the counter again for the time during which accumulator 4 is on charger 2.

Figure 3:
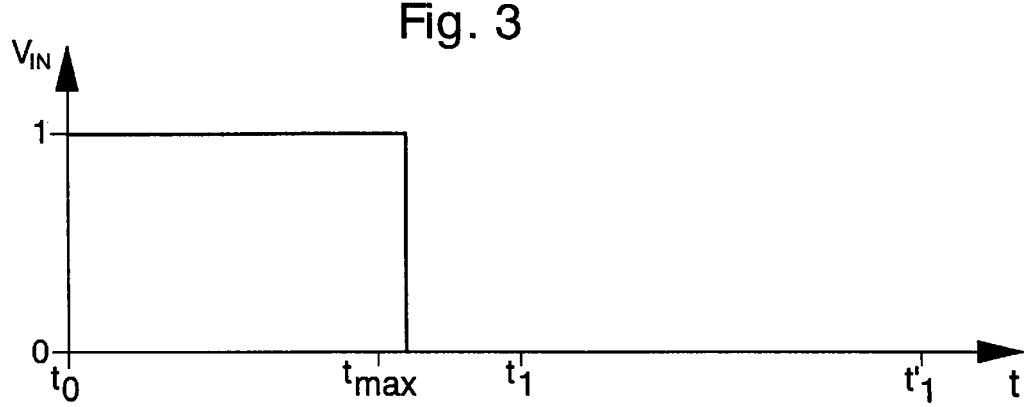
FIG. 3 is a graphic diagram of an accumulator charge/discharge cycle in which the counter is decremented and reaches zero, time at which a completely new charge of said accumulator is authorized according to a step which varies as a function of the intensity of the current supplied by said accumulator during use.
Figure 3:
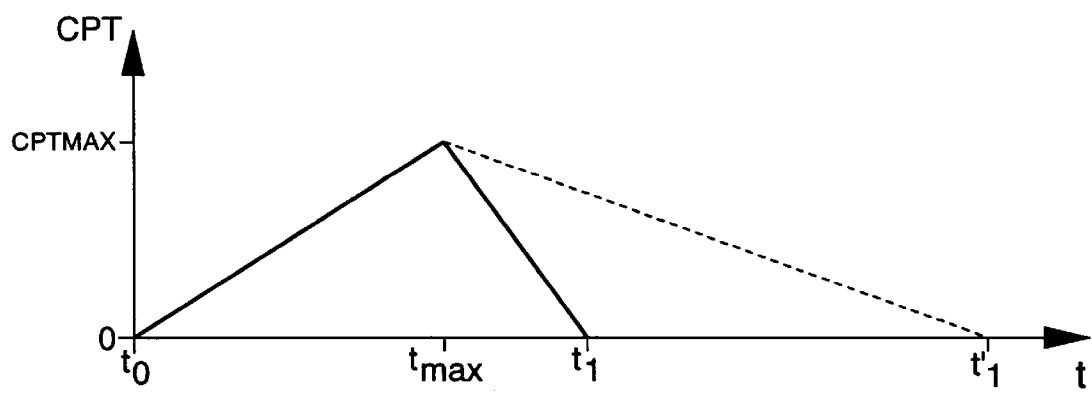
Figure 3:
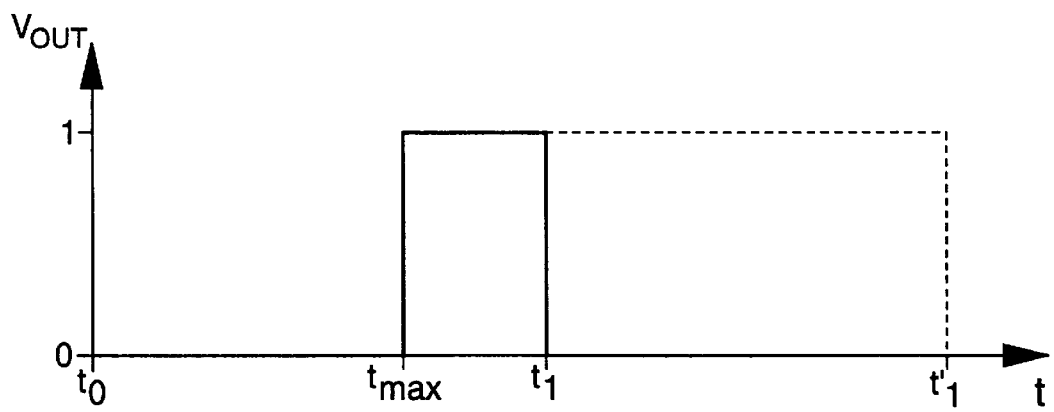

According to a particularly advantageous feature of the invention, the speed at which the counter is decremented from the moment when accumulator 4 is non longer on charger 2 is not fixed definitively, but is modulated as a function of the discharge current supplied by said accumulator 4 (FIG. 3). Thus, if accumulator 4 is only powering the horological function of the watch which consumes very little current, the speed at which counting signal CPT is decremented will be low, so that the time $t'_1$ when counting signal CPT reaches zero and beyond which a new complete charge of accumulator 4 can be authorized will be substantially increased, i.e. a new charge of said accumulator 4 will be authorized less quickly. Conversely, if the wearer of the watch uses intensively, for example the telephone function which consumes a lot of power, the speed at which counting signal CPT is decremented will by higher, so that the time $t_1$ when counting signal CPT reaches zero and beyond which a new complete charge of accumulator 4 will be authorized will be substantially reduced.

According to a complementary feature of the invention, the speed at which counting signal CPT is incremented is different from the speed at which this same counting signal CPT is decremented.

Figure 4:
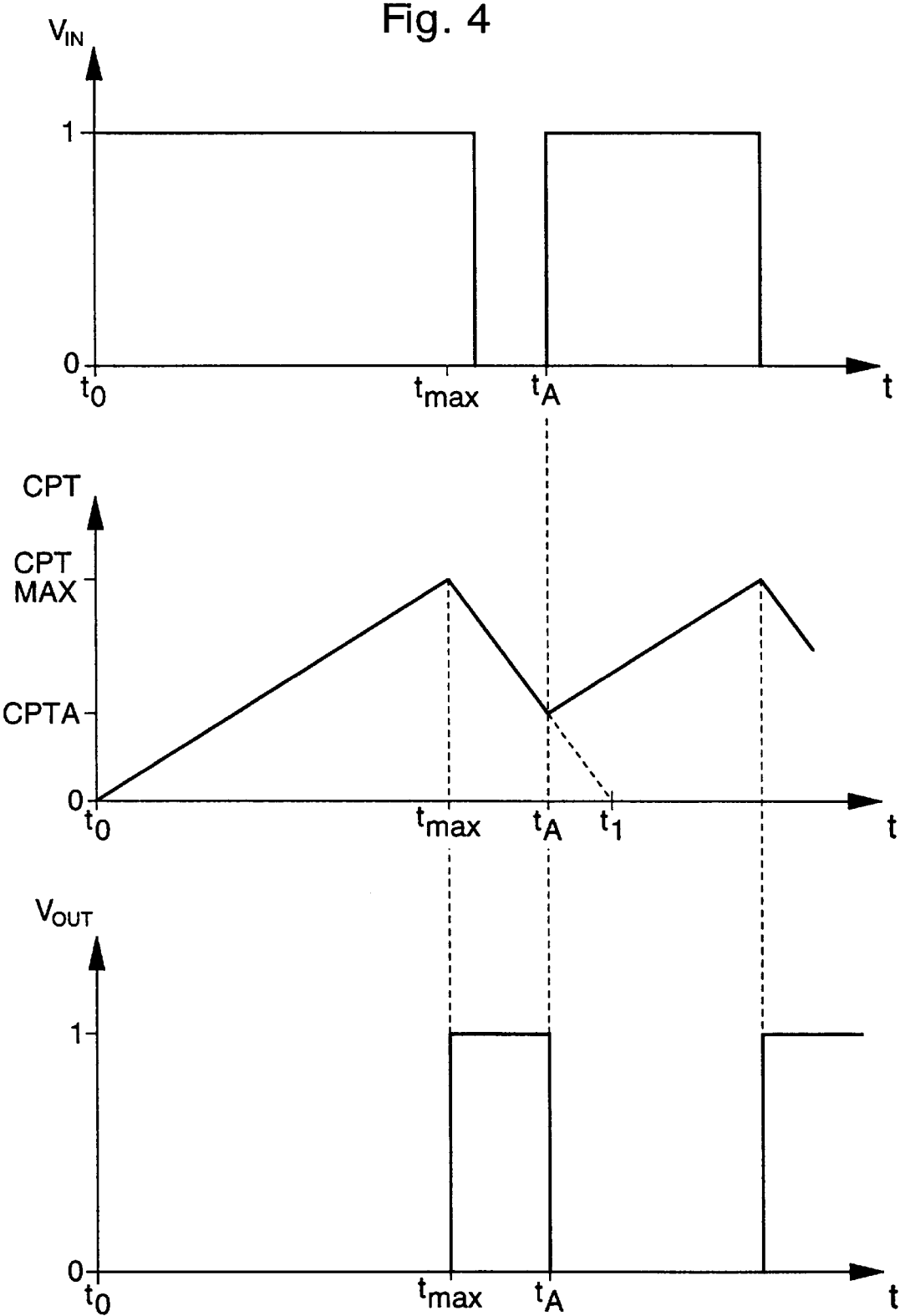
FIG. 4 is a graphic diagram of an accumulator charge/discharge cycle when the latter is replaced on the charger before the counter has reached zero.

The case (FIG. 4) in which accumulator 4 is replaced on charger 2 at an instant $t_A$ before counting signal CPT has reached zero, i.e. before control circuit 12 can authorize a new complete charge of said accumulator 4, will now be examined. In this case, control circuit 12 authorizes a partial charge of accumulator 4. Counting signal CPT then increases progressively from a value CPTA which it had at instant $t_A$ to its maximum value CPTMAX corresponding to the nominal charge of accumulator 4. It will be noted that the positive gradient of counting signal CPT after instant $t_A$ when accumulator 4 is placed on charger 2 is the same as that which would have been obtained before counting signal CPT had reached its maximum value CPTMAX.

Conversely, it can be assumed (FIG. 5) that accumulator 4 is removed from charger 2 at an instant $t_B$ before counting signal CPT has reached its maximum value CPTMAX, i.e. before accumulator 4 has reached its nominal charge. In this case, counting signal CPT decreases progressively from a value CPTB which it had at instant $t_B$ to zero where the discharge time reaches the value $t_C$ beyond which control circuit 12 again authorizes a complete charge of accumulator 4. It will be noted that the negative gradient of counting signal CPT after instant $t_B$ when accumulator 4 is removed from charger 2 is the same as that which would have been obtained for the same auxiliary function after counting signal CPT has reached its maximum value CPTMAX. Thus, the time necessary to reach instant $t_C$ when a new complete charge is authorized is shorter than the time which separates instants tmax and $t_1$ in the case of a normal charge/discharge cycle. It is to be noted, in this case, that the charge interruption signal $V_{OUT}$ remains constantly at zero as long as counting signal CPT has not reached its maximum value CPTMAX corresponding to the nominal charge of accumulator 4.

Finally, the case (FIG. 6) in which accumulator 4 is left on charger 2 after counting signal CPT has reached its maximum value CPTMAX corresponding to the nominal charge of said accumulator 4 will be considered. At the instant when counting signal CPT reaches value CPTMAX, charge interruption signal $V_{OUT}$ is set to 1 and accumulator 4 is no longer supplied with current. In this case, counting signal CPT decreases progressively from its value CPTMAX which it had at instant tmax to a value CPTD which it reaches at instant $t_D$. At this instant $t_D$, a partial charge of accumulator 4 is again authorized and charge interruption signal $V_{OUT}$ is set to zero. It will be understood that the negative gradient of counting signal CPT is low and determined taking account of the self-discharge current of accumulator 4, and that a new charge is authorized in order to maintain the charge of accumulator 4 once minimum value $t_D$ allowed for the self-discharge time is reached.

It goes without saying that various variants and modifications fall within the scope of the present invention.

What is claimed is:

1. A method for controlling the charge of an accumulator, as a function of the time during which said accumulator has been on a charger, said accumulator being intended to power an horological function and one or more auxiliary functions, wherein this method comprises the steps of:
   incrementing a step counting signal during the charge time during which the accumulator is on the charger;
   causing the accumulator charge to stop when the counting signal has reached a previously defined maximum value corresponding to the nominal charge of said accumulator; and
   decrementing the step counting signal during the discharge time during which the accumulator is not on the charger, the counting signal being decremented by a first step when only the horological function is being used, and by a second step which differs from the first and which depends on the auxiliary function or functions used so that, if the counting signal reaches zero, the next charge will be made until said counting signal has again reached its maximum value, whereas if the accumulator is replaced on the charger before the counting signal has reached zero, the next charge will be made for a shorter period of time.

2. A method according to claim 1, wherein whatever interruption occurs to the charging of the accumulator before the counting signal has reached its maximum value corresponding to the nominal charge of said accumulator, the step by which said counting signal is decremented is that which would have been observed for the same auxiliary function after having reached.

3. A method according to claim 1, wherein, if the accumulator is replaced on the charger before the counting signal has reached zero, only a partial charge is authorized, and the step by which said counting signal is incremented is the same as that which would have been used for a complete charge.

4. A method according to claim 1, wherein the speed at which the counting signal is incremented is different from the speed at which the same counting signal is decremented.

5. A method according to claim 1, wherein the maximum value of the counting signal is modulated as a function of the intensity of the charge current which is injected into the accumulator.

6. A method according to claim 1, wherein if the accumulator is left on the charger after the counting signal has reached its maximum value corresponding to the nominal charge of said accumulator, the negative gradient of the counting signal is determined taking account of the self-discharge current of the accumulator, and a new charge is authorized in order to maintain the charge of the accumulator once a minimum value accepted for the counting signal is reached.

7. A device for controlling an accumulator charge as a function of the time during which said accumulator has been on a charger, said accumulator being intended to power a horological function and one or more auxiliary functions, wherein this device includes an electronic control circuit which increments a step counter during the charge time during which the accumulator is on the charger, causes the accumulator charge to stop when the counter has reached a maximum value corresponding to the nominal charge of said accumulator and decrements the step counter during the discharge time during which the accumulator is not on the charger, the counter being decremented by a first step when only the horological function is being used, and by a second step which differs from the first and which depends on the auxiliary function or functions used so that, if the counter reaches zero, the next charge authorized by the electronic control circuit will be made until the counter has again reached its maximum value, whereas if the accumulator is replaced on the charger before the counter has reached zero, the electronic control circuit only authorizes partial charging of the accumulator.

8. A device according to claim 7, wherein the electronic control circuit begins to increment the counter from the moment when a charge control signal indicating that the accumulator is placed on the charger is applied thereto, and in that said electronic control circuit generates a charge interruption signal under the effect of which the charging of the accumulator is interrupted when the current has reached the maximum value corresponding to the nominal charge of said accumulator.

9. A device according to claim 8, wherein the charge interruption signal controls the opening of the interruption means.

10. A device according to claim 9, wherein the interruption means include a switch.

11. A device according to claim 7, wherein the electronic control circuit is a clockwork processor.

12. A device according to claim 11, wherein the clockwork processor includes a time base and an incremental counter.

13. A device according to claim 12, wherein the time base is provided by a quartz oscillator.

* * * * *